United States Patent
Mattes et al.

(10) Patent No.: US 6,496,759 B1
(45) Date of Patent: Dec. 17, 2002

(54) PROCESS FOR DETERMINING A CRITICAL ANGULAR POSITION OF A VEHICLE LEADING TO ROLL-OVER

(75) Inventors: Bernhard Mattes, Sachsenheim (DE); Volker Breunig, Heilbronn-Neckargartach (DE); Lothar Groesch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,602

(22) PCT Filed: Feb. 19, 1999

(86) PCT No.: PCT/DE99/00453

§ 371 (c)(1),
(2), (4) Date: Mar. 1, 2001

(87) PCT Pub. No.: WO99/67111

PCT Pub. Date: Dec. 29, 1999

(30) Foreign Application Priority Data

Jun. 25, 1998 (DE) .......................................... 198 28 338

(51) Int. Cl.$^7$ ................................................. G06F 7/00
(52) U.S. Cl. ............................. 701/1; 701/46; 180/282; 280/734; 340/438; 340/440
(58) Field of Search ................................. 701/1, 29, 46; 180/268, 282; 280/707, 734; 340/438, 440

(56) References Cited

U.S. PATENT DOCUMENTS

| | | | |
|---|---|---|---|
| 5,825,284 A | * 10/1998 | Dunwoody et al. | .......... 340/440 |
| 6,002,975 A | * 12/1999 | Schiffmann et al. | ........... 701/36 |
| 6,038,495 A | * 3/2000 | Schiffmann | ...................... 701/1 |
| 6,192,305 B1 | * 2/2001 | Schiffmann | ................... 701/45 |
| 6,282,474 B1 | * 8/2001 | Chou et al. | ..................... 701/45 |

FOREIGN PATENT DOCUMENTS

| | | |
|---|---|---|
| DE | 196 09 717 | 9/1997 |
| EP | 0 331 131 | 9/1989 |
| EP | 0 498 312 | 8/1992 |
| WO | WO 97 49 578 | 12/1997 |

* cited by examiner

*Primary Examiner*—Gertrude Arthur
(74) *Attorney, Agent, or Firm*—Kenyon & Kenyon

(57) ABSTRACT

A method is used to largely suppress the offset of a rotation rate sensor in that a given rotation rate is only subjected to integration if it exceeds a lower rotation rate threshold and lies below an upper rotation rate threshold. The thresholds are predefined as a function of an offset of the rotation rate sensor in question, and integration of the rotation rate is aborted after a predefined reset time and restarted.

6 Claims, 1 Drawing Sheet

PROCESS FOR DETERMINING A CRITICAL ANGULAR POSITION OF A VEHICLE LEADING TO ROLL-OVER

FIELD OF THE INVENTION

The present invention relates to a method for determining a critical angular position of a vehicle that will cause a rollover event, with one or more rotation rate sensors measuring the vehicle's rotation rate about its longitudinal axis and/or transverse axis, and then the roll angle about the vehicle's longitudinal axis and/or the pitch angle about the vehicle's transverse axis is determined by obtaining the integral of the measured rotation rates so that a critical angular position can be detected therefrom via a threshold value decision unit.

BACKGROUND INFORMATION

A method of this kind is described in German Patent Application No. 196 09 717.1. If a vehicle undergoes a rollover, protection devices installed in the vehicle must be triggered in a timely manner; these include, for example, a roll bar, a seatbelt tensioner and various airbags. To ensure that all these protection devices are triggered in a timely manner, it is important that it be determined as early as possible whether the vehicle's rotations about its longitudinal axis and its transverse axis will result in a rollover. It is important that as far as possible erroneous decisions regarding a rollover event be eliminated. Erroneous decisions occur if, when the integral of the rotation rate is determined, the result indicates a roll or pitch angle which does not match the vehicle's actual angular position. Because the rotation rate sensors generally have an offset, errors may inadvertently occur when the vehicle's angular position is calculated.

Therefore the object of the present invention is to provide a method with which as far as possible an error arising from an offset when measuring rotation rate is suppressed.

SUMMARY OF THE INVENTION

The aforementioned object is achieved in that a given rotation rate is only subjected to integration if it exceeds a lower rotation rate threshold and lies below an upper rotation rate threshold, the thresholds being predefined as a function of the offset error of the rotation rate sensor in question. The integration of the rotation rate is aborted after a predefinable reset time and restarted. This prevents a situation where, because integrals are being calculated on an ongoing basis, angles which have a value that is much greater than the actual angular position and which are then interpreted as a rollover event, which is not actually occurring, are obtained.

It is useful if the reset time is set as a function of the magnitude of the roll angle or pitch angle obtained via integration and/or as a function of the magnitude of the sensor error.

Detailed Description

Figure 1:
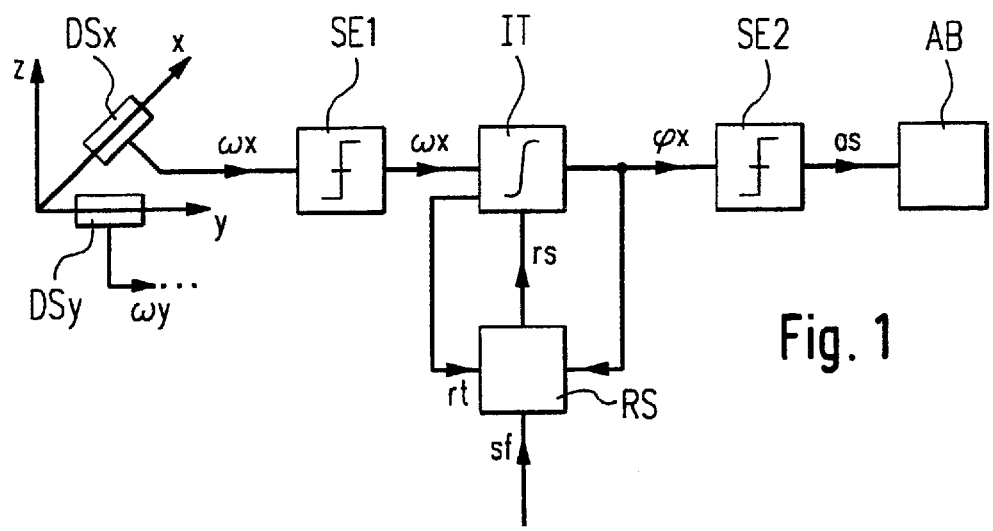
FIG. 1 shows a function chart showing how a critical angular position of a motor vehicle that results in a rollover event is determined.

FIG. 1 shows a vehicle coordinate system, x being the longitudinal axis, y the transverse axis and z the vertical axis of the vehicle. A rotation rate sensor DSx, which measures the vehicle's rotation rate about its longitudinal axis x and a rotation rate sensor DSy, which measures the vehicle's rotation rate about its transverse axis y, are arranged in the vehicle. In the subsequent function blocks, rotation rate $\omega x$ for example, which is the rotation rate that most frequently causes a rollover event—namely the rotation rate about the vehicle's longitudinal axis—is subjected to processing. Rotation rate $\omega y$ about the vehicle's transverse axis y is subjected to an evaluation in the same way as rotation rate $\omega x$.

Figure 2:
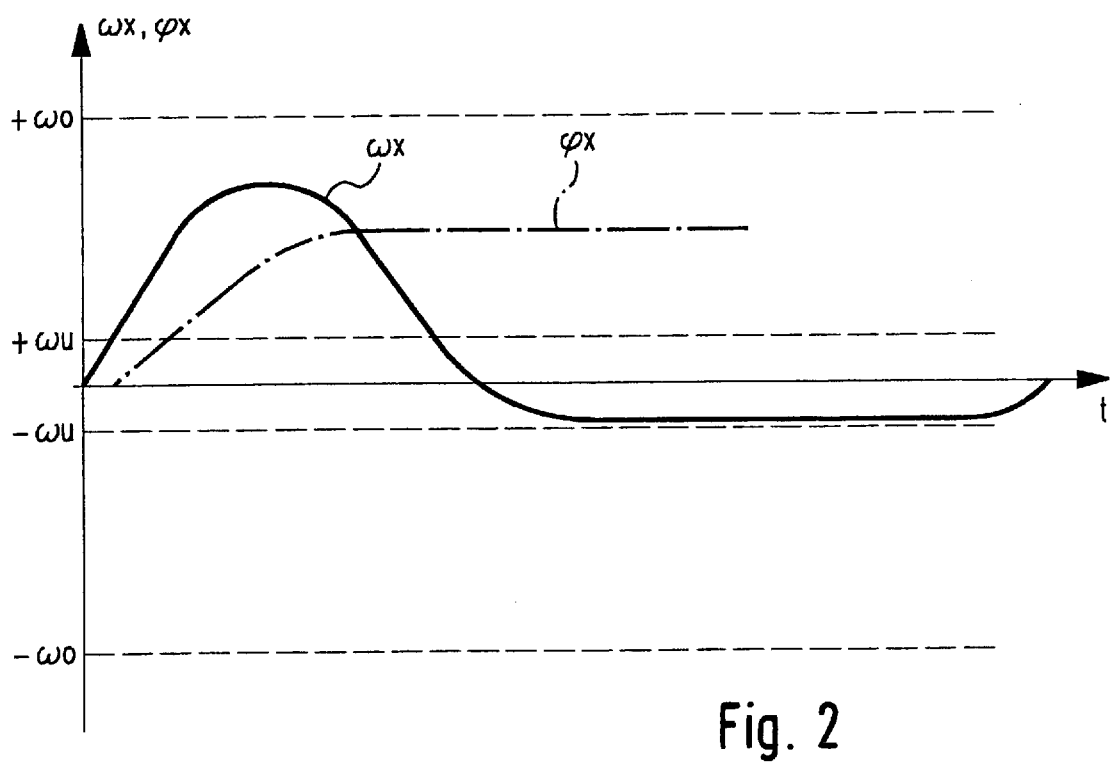
FIG. 2 shows a rotation rate and a roll angle plotted against time.

FIG. 2 shows rotation rate $\omega x$ plotted against time. A rotation rate sensor has an offset error; in other words, it outputs a measured rotation rate even if the vehicle is not in fact rotating. In order to suppress this offset error, a lower threshold $+\omega u$ and an upper threshold $+\omega o$ are predefined for the positive direction of rotation, and a lower threshold $-\omega u$ and an upper threshold $-\omega o$ are predefined for the negative direction of rotation. These thresholds are determined empirically based on the offset error of the rotation rate sensor in question. Threshold value decision unit SE1 only lets through the rotation rates among measured rotation rates $\omega x$ that are above lower threshold $+\omega u$, $-\omega u$ and below upper threshold $+\omega o$, $-\omega o$. In other words only rotation rates $\omega x$ that lie between thresholds $+\omega u$ and $+\omega o$ and, respectively, between thresholds $-\omega u$ and $-\omega o$ are subjected to an integration IT. Because the rotation rates below lower threshold $+\omega u$, $-\omega u$ and above upper threshold $+\omega o$, $-\omega o$ are suppressed, no angle components attributable to the offset of rotation rate sensor DSx are present in roll angle $\psi x$ obtained from subsequent integration IT of rotation rate $\omega x$.

However, by using thresholds $+\omega u$, $-\omega u$ and $+\omega o$, $-\omega o$ to place limitations on integration, the following error may arise in the position angle that is calculated. FIG. 2 shows rotation rate $\omega x$ of a vehicle plotted against time; initially, the vehicle undergoes a very rapid rotation movement about its longitudinal axis in the positive direction and then undergoes a very slow rotation back again in the negative direction. As a result, initially rotation rate $\omega x$ increases very rapidly, and thus also exceeds lower threshold $+\omega u$, then it falls back again into the negative range but does not exceed lower threshold $-\omega u$, because the vehicle rotates back again with a very low rotation rate. A situation of this kind may occur, for example, with different degrees of inclination of the road. A similar situation arises with regard to the angle of pitch about the vehicle's transverse axis if, for example, a vehicle is descending a hill fast and then travels uphill again slowly. Because part of the measured rotation rate $\omega x$ does not exceed lower threshold $-\omega u$, this part of the rotation rate does not contribute to angle $\psi x$ determined from integration IT. Therefore angle $\psi x$ retains the value that was obtained by integrating rotation rate $\omega x$ up until the point in time when it fell below lower threshold $+\omega u$. Ultimately this means angle $\psi x$ is much too great. If the vehicle now undergoes further rotations, this angle $\psi x$, which is already too great, may be increased even further and may very quickly reach the range in which the circuit decides that a rollover event is occurring and triggers the safety devices even though the vehicle is not in fact undergoing a rollover.

As a result, in the case of offset suppression the following measure is taken to ensure that the angle error described above is suppressed as far as possible: a reset contact unit RS, which sends reset single rs to integrator IT, thereby aborting integration of rotation rate $\omega x$ and restarting it, is provided. This means that angle $\psi x$, reached at the time of the reset, is reset to an initial angle which is either 0 or some other small predefinable value. Integrator IT sends reset contact unit RS a start signal rt when the rotation rate exceeds lower threshold +ωu, −ωu, thereby causing integration to begin. Once start signal rt has been received, a counter for a reset time after which reset signal rs is sent to integrator IT, starts running. The reset time may be set as a function of the magnitude of angle ψx obtained via integration. For this reason, angle ψx is sent to reset contact unit RS. In addition, the reset time may be set as a function of the sensor error.

Sensor error sf, which is sent to reset contact unit RS, is made up of rotation rate sensor errors that have been determined empirically. Errors of this kind are, for example, offset errors or linearity errors. The reset time may also be dependent on the vehicle type, as certain vehicles have a tendency to roll over at a lower pitch or roll angle than others.

Thanks to the reset procedure for integration IT, there is no danger that angle ψx will rise to a value sufficiently great to cause threshold value decision unit SE2 to decide that a rollover event is occurring due to vehicle movements that would not in fact ever cause a rollover event. Threshold value decision unit SE2 sends a trigger signal as to safety devices AB of the vehicle if angle ψx exceeds a predefined critical threshold.

What is claimed is:

1. A method for determining a critical angular position of a vehicle that will cause a rollover event, comprising the steps of:

measuring at least one of a first vehicle rotation rate about a longitudinal axis and a second vehicle rotation rate about a transverse axis, with at least one of a first and second rotation rate sensor, the first and second rotation rate sensors associated with the first and second vehicle rotation rates respectively;

determining at least one of first and second lower and upper rotation rate thresholds associated with each of at least one of the first and second rotation rate sensors, the lower and upper thresholds predefined as a function of an offset error of the respective first and second rotation rate sensors;

integrating the at least one first and second vehicle rotation rates if it exceeds the respective first and second lower thresholds and is less than the respective first and second upper thresholds;

aborting integration after a predefined reset time;

restarting integration;

determining at least one of a roll angle and a pitch angle from integration; and detecting a critical angular position via a threshold decision unit.

2. The method of claim 1, further comprising the step of:

setting the reset time as a function of a magnitude of at least one of the roll angle and the pitch angle obtained from integration.

3. The method of claim 1, further comprising the step of:

setting the reset time as a function of a magnitude of the offset error of at least one of the first and second rotation rate sensors.

4. A method for determining a critical angular position of a vehicle that will cause a rollover event, comprising the steps of:

measuring at least one of a first vehicle rotation rate about a longitudinal axis and a second vehicle rotation rate about a transverse axis, with at least one of a first and second rotation rate sensor, the first and second rotation rate sensors associated with the first and second vehicle rotation rates respectively;

determining at least one of first and second lower and upper rotation rate thresholds associated with each of at least one of the first and second rotation rate sensors, the lower and upper thresholds predefined as a function of an offset error of the respective first and second rotation rate sensors;

integrating the at least one first and second vehicle rotation rates only if it exceeds the respective first and second lower thresholds and is less than the respective first and second upper thresholds;

aborting the integration after a predefined reset time;

restarting the integration;

determining at least one of a roll angle and a pitch angle from the integration; and detecting a critical angular position via a threshold decision unit.

5. The method of claim 4, further comprising the step of:

setting the reset time as a function of a magnitude of at least one of the roll angle and the pitch angle obtained from integration.

6. The method of claim 4, further comprising the step of:

setting the reset time as a function of a magnitude of the offset error of at least one of the first and second rotation rate sensors.

* * * * *